3,699,072
SILICONE ELASTOMER WITH UNPRIMED
ADHESION
William H. Clark, Mount Pleasant, and William R. Hays,
Midland, Mich., assignors to Dow Corning Corporation, Midland, Mich.
No Drawing. Filed June 24, 1971, Ser. No. 156,551
Int. Cl. C08g 51/04, 31/02
U.S. Cl. 260—37 SB                     11 Claims

ABSTRACT OF THE DISCLOSURE

A composition of a vinyldiorganosiloxy endblocked polydimethylsiloxane and a mixture of an organosiloxane having 5 to 20 silicon atoms per molecule and an average of at least three silicon-bonded hydrogen atoms per molecule and a modified organosiloxane having 6 to 21 silicon atoms per molecule, an average of at least two silicon-bonded hydrogen atoms per molecule and an average of at least one unit of $(RO)_3Si(CH_2)_x(CH_3)SiO$, $(RO)_3Si(CH_2)_x(CH_3)_2SiO_{0.5}$ and mixtures thereof where R is methyl, ethyl or

and $x$ is 2 or 3 is curable to an elastomer which has improved unprimed adhesion to substrates, particularly metal substrates.

---

This invention relates to an organosiloxane composition which is curable to an elastomer which has improved unprimed adhesion to substrates.

The adhesion of silicone elastomers to substrates, such as metals, glass, paper, wood, masonry, stone and the like is of significant importance to the spectrum of utility of the silicone elastomer. Although some silicone elastomers adhere to some substrates, not all silicone elastomers adhere to all substrates. Furthermore, those silicone elastomers which do adhere to some substrates often have adhesive strengths which limit their utility. One method of gaining improved adhesion to various substrates is to prime the surface. This procedure although often effective has the disadvantage that the user is required to apply two compositions. This is time consuming, inconvenient and in general more expensive. Therefore, to avoid the use of a primer, the elastomer composition can be formulated to provide the necessary adhesion without the use of primers. The addition of ingredients to elastomer formulations is not without problems, since some ingredients can destroy the elastomeric properties, inhibit cure and the like. The composition of this invention does not interfere with the elastomer in any way and still provides improved adhesion to substrates.

It is therefore an object of this invention to provide a siloxane composition which can be cured to an elastomer having improved unprimed adhesion to substrates. This object and others will become apparent from the following detailed description of the present invention.

This invention relates to a curable composition consisting essentially of (1) a vinyldiorganosiloxy endblocked polydimethylsiloxane having a viscosity of from 1000 to 100,000 cs. at 25° C. wherein the organic groups of the vinyldiorganosiloxy units are selected from the group consisting of methyl and phenyl, (2) a mixture consisting essentially of (a) an organosiloxane having an average of from 5 to 20 inclusive silicon atoms per molecule, organosiloxane units bonded together through silicon-oxygen-silicon bonds and selected from the group consisting of dimethylsiloxane units and methylhydrogensiloxane units and endblocked with organosiloxane units selected from the group consisting of trimethylsiloxane units and dimethylhydrogensiloxane units, there being present an average of at least three silicon-bonded hydrogen atoms per molecule and (b) a modified organosiloxane having an average of from 6 to 21 silicon atoms per molecule, organosiloxane units bonded together through silicon-oxygen-silicon bonds selected from the group consisting of dimethylsiloxane units, methylhydrogensiloxane units and $(RO)_3Si(CH_2)_x(CH_3)SiO$ units wherein R is a monovalent radical selected from the group consisting of methyl, ethyl and

and $x$ is an integer of from 2 to 3 inclusive, and endblocked with organosiloxane units selected from the group consisting of trimethylsiloxane units, dimethylhydrogensiloxane units and $(RO)_3Si(CH_2)_x(CH_3)_2SiO_{0.5}$ units, there being present an average of at least two silicon-bonded hydrogen atoms per molecule and an average of one siloxane unit selected from the group consisting of $(RO)_3Si(CH_2)_x(CH_3)SiO$ units and

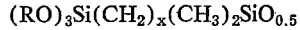

units, said mixture (2) being present in an amount sufficient to provide at least one silicon-bonded hydrogen atom per vinyl radical in (1) and not more than 10 silicon-bonded hydrogen atoms per vinyl radical in (1), said mixture having present from 15 to 75 mol percent modified organosiloxane (b) where (a) and (b) are 100 mol percent.

The vinyldiorganosiloxy endblocked polydimethylsiloxanes (1) are well known in the art. These polydimethylsiloxanes can have viscosities of from 1000 to 100,000 cs. at 25° C., preferably 2000 to 60,000 cs. at 25° C. The organic groups of the vinyldiorganosiloxy units can be methyl or phenyl.

The mixture (2) is a crosslinking agent which in the composition of this invention, enhances the adhesion of the silicone elastomer to substrates without the use of primers. Mixture (2) is a combination of (a) an organosiloxane having 5 to 20 silicon atoms per molecule and at least three silicon-bonded hydrogen atoms and (b) a modified organosiloxane having 6 to 21 silicon atoms and at least two silicon-bonded hydrogen atoms and an average of one siloxane unit of the formula $(RO)_3Si(CH_2)_x(CH_3)SiO$

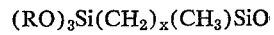 or mixtures thereof.

Organosiloxane, (a), contains at least three silicon-bonded hydrogen atoms per molecule and from 5 to 20 silicon atoms per molecule. The organosiloxane contains organosiloxane units bonded through silicon-oxygen-silicon bonds where the units can be dimethylsiloxane units and methylhydrogensiloxane units and endblocking units of trimethylsiloxane and dimethylhydrogensiloxane. The organosiloxane contains combinations of the above siloxane units such that there are at least three silicon-bonded hydrogen atoms per molecule and 5 to 20 silicon atoms per molecule. The organosiloxanes (a) can be illustrated by a copolymer containing two units of trimethylsiloxane, five units of methylhydrogensiloxane and three units of dimethylsiloxane, a copolymer containing two units of dimethylhydrogensiloxane, three units of methylhydrogensiloxane and five units of dimethylsiloxane, a copolymer of two units of trimethylsiloxane, seven units of methylhydrogensiloxane and eleven units of dimethylsiloxane, a copolymer of two units of trimethylsiloxane and eighteen units of methylhydrogensiloxane, a copolymer of two units of trimethylsiloxane and three units of methylhydrogensiloxane, and a copolymer of two units of dimethylhydrogensiloxane, ten units of methylhydrogensiloxane and two units of dimethylsiloxane. The number of siloxane units in the copolymers are the average number per molecule. The organosiloxanes (a) are well known in the art.

The modified organosiloxanes (b) are the organosiloxanes of (a) wherein some of the silicon-bonded hydrogen atoms have been replaced by $(RO)_3Si(CH_2)_{x-}$. R is methyl, ethyl, or $$CH_3\overset{O}{\underset{\|}{C}}-$$

and $x_-$ is 2 or 3. Therefore, organosiloxane (b) contains one more silicon atom per molecule than its precursor and the average number of silicon atoms per molecule is 6 to 21. The modified organosiloxane (b) therefore contains organosiloxane units selected from dimethylsiloxane units, trimethylsiloxane units, methylhydrogensiloxane units, dimethylhydrogensiloxane units $(RO)_3Si(CH_2)_x(CH_3)SiO$ units and $(RO)_3Si(CH_2)_x(CH_3)_2SiO_{0.5}$ units. The organosiloxane (b) contains an average of at least two units having silicon-bonded hydrogen atoms and an average of one unit of $(RO)_3Si(CH_2)_x(CH_3)SiO$, $$(RO)_3Si(CH_2)_x(CH_3)_2SiO_{0.5}$$

and mixtures thereof. The following copolymers illustrate the modified organosiloxane (b), a copolymer having an average of one unit of $$(CH_3COO)_3SiCH_2CH_2(CH_3)_2SiO_{0.5}$$

one unit of dimethylhydrogensiloxane, four units of dimethylsiloxane and methylhydrogensiloxane, a copolymer having an average of one unit of $$(CH_3O)_3SiCH_2CH_2(CH_3)_2SiO_{0.5}$$

five units of dimethylsiloxane, three units of methylhydrogensiloxane and one unit of dimethylhydrogensiloxane, a copolymer containing an average of one unit of $(CH_3CH_2O)_3SiCH_2CH_2(CH_3)_2SiO_{0.5}$, one unit of dimetylhydrogensiloxane and three units of methylhydrogensiloxane, a copolymer containing an average of one unit of $(CH_3O)_3SiCH_2CH_2CH_2(CH_3)_2SiO_{0.5}$, one unit of dimethylhydrogensiloxane, two units of dimethylsiloxane and two units of methylhydrogensiloxane, a copolymer containing an average of two units of trimethylsiloxane, two units of methylhydrogensiloxane and one unit of $(CH_3COO)_3SiCH_2CH_2(CH_3)SiO$, a copolymer containing an average of two units of trimethylsiloxane, one unit of $(CH_3O)_3SiCH_2CH_2(CH_3)SiO$, four units of methylhydrogensiloxane, and three units of dimethylsiloxane, a copolymer containing an average of two units of dimethylhydrogensiloxane, one unit of $$(CH_3CH_2O)_3SiCH_2CH_2CH_2(CH_3)SiO$$

two units of methylhydrogensiloxane and five units of dimethylsiloxane and a mixture of a copolymer containing an average of one unit of $$(CH_3COO)_3SiCH_2CH_2(CH_3)_2SiO_{0.5}$$

three units of methylhydrogensiloxane, five units of dimethylsiloxane and one unit of dimethylhydrogensiloxane and a copolymer containing an average of two units of dimethylhydrogensiloxane, two units of methylhydrogensiloxane, one unit of $(CH_3COO)_3SiCH_2CH_2(CH_3)SiO$ and five units of dimethylsiloxane. There may be some molecules of organosiloxane (b) which have two units of the adduct. However, since the ratio of organsiloxane containing the silicon-bonded hydrogen atoms to silane is in favor of only one adduct per molecule, there will not be large amounts of such molecules. The mixture of (a) and (b) can include such amounts of molecules with two adducts without departing from the scope of this invention.

Mixture (2) can be prepared by reacting part of the organosiloxane containing silicon-bonded hydrogen atoms with a silane such as vinyltriacetoxysilane, allyltrimethoxysilane, vinyltriethoxysilane, vinyltrimethoxysilane, allyltriacetoxysilane and allyltriethoxysilane. The amount of silane used is sufficient to provide 15 to 75 mol percent of modified organosiloxane (b) with the remainder unreacted organosiloxane as defined in (a) and the mixture of (a) and (b) is 100 mol percent. The reaction is best carried out by heating a mixture of organosiloxane having silicon-bonded hydrogen atoms and the silane for 1 to 2 hours at 140° C. to 160° C. The reaction can be carried out at lower temperatures and in shorter periods of time by heating the reaction mixture in the presence of a platinum in preparing the mixture (2) is not preferred when the composition of this invention is to be stored for long periods of time, since the residual platinum catalyst from the preparation of mixture (2) will cause the composition to cure. When a platinum catalyst is used to prepare the mixture and storage of the composition is desired, the platinum catalyst should be removed by careful filtration such as mixing with charcoal and then filtering. However, the platinum need not be removed and the mixture (2) can be added to the vinyldiorganosiloxy endblocked polydimethylsiloxane at the time cure is desired.

The platinum catalyst need not be removed if the composition is to be cured above room temperature, such as above 50° C. to 70° C. Where a heat cure is desired, the platinum catalyst composition can contain an inhibitor which inhibits cure at room temperature and up to about 50° C., however, the composition cures when heated above 50° C. Such inhibitors include benzotriazole, stannous salts, mercuric salts, bismuth salts, cuprous salts, cupric salts, acetylenic unsaturated compounds such as 2-ethynylisopropanol and the like.

The composition of this invention can be prepared by mixing the vinyldiorganosiloxy endblocked polydimethylsiloxane with mixture (2) such that there is at least one silicon-bonded hydrogen atom per vinyl radical of the vinyldiorganosiloxy endblocked polydimethylsiloxane. The amount of mixture (2) can be sufficient enough to provide up to ten silicon-bonded hydrogen atoms per vinyl radical of (1) or more. The higher ratio of silicon bonded hydrogen atoms to vinyl radical is preferably used when the composition of this invention has a filler present.

The compositions of this invention can be cured by adding a platinum catalyst. The platinum catalyst can be present in catalytic amounts such as 0.5 to 200 parts by weight of platinum per million parts by weight of vinyldiorganosiloxy endblocked polydimethylsiloxane, preferably from 1 to 50 parts by weight of platinum per million parts by weight of the polydimethylsiloxane.

The platinum catalysts are well known and any of the platinum catalysts which are readily dispersible in the composition of this invention are suitable. The platinum catalysts can be illustrated by platinic chloride, salts of platinum, platinum complexes and chloroplatinic acid, such as $PtCl_2\{P(CH_2CH_2CH_3)_3\}_2$, platinum bromides, a complex of platinous halide and an olefin such as ethylene, $Pt(CH_3CN)_2Cl_2$, $\{Pt(CH_3CN)_2(CH_3)_4\}Cl_2$, $Pt(NH_3)_2Cl_2$, $K\{PtCl_3CH_2CH_2CH_2OH\}$, $PtBr_2(C_2H_4)_2$, $K\{PtBr_3(C_2H_4)\}$, $PtCl_2(C_2H_4)$, $(CH_3)_2C=CH_2 \cdot PtCl_2$, $H_2Pt(CN)_4 \cdot 5H_2O$, $H\{PtCl_3(CH_3CN)\}$, $Pt(NH_3)_2(CNS)_2$, $PtCl_2 \cdot PCl_3$, $\{Pt(NH_3)_4\} \cdot \{PtCl_4\}$, $PtCl_2\{P(CH_2CH_3)_3\}_2$, $PtCl_2 \cdot P(OH)_3$, $PtCl_2 \cdot P(OCH_2CH_3)_3$, $PtCl_2 \cdot \{P(OCH_2CH_3)_3\}_2$, $Pt(OOCCH_2SCH_2CH_3)_2$, $Pt(CN)_3$, $(CH_3)_4Pt$, $(CH_3)_3Pt-Pt(CH_3)_3$, $$(CH_3)_3Pt(CH_3COCH=\overset{-O}{\underset{|}{C}}CH_3)$$

$PtCl_2CO$ and $PtBr_2CO$.

The composition of this invention can also contain fillers. The fillers are those conventionally used in silicon elastomers either reinforcing such as fume silica or non-reinforcing. The silica fillers can be treated or untreated to make them hydrophobic. Treated fillers are well known in the art and include treatment with chlorosilanes, such as triorganochlorosilanes and diorganodichlorosilanes, diorganocyclosiloxanes, hexaorganodisiloxane, organosilazanes and the like. Examples of suitable fillers include, fume silica, silica aerogel, silica xerogel, silica soot, carbon black, quartz, diatomaceous earth, metal carbonates such as calcium carbonate, metal oxides, such as alumina, metal silicates such as zirconium silicate, clays, talc and the like. The amount of filler can vary broadly from no filler to amounts such as 200 parts by weight per 100 parts by weight of composition depending upon the filler and the properties desired.

The compositions of this invention can also contain other ingredients conventionally used in silicone elastomers such as pigments and dyes to impart color, plasticizers, heat stability additives and the like.

The compositions of this invention can be prepared by mixing the ingredients by conventional means, such as milling, commercial mixers and the like. The order of mixing is not narrowly critical, however, one convenient method is to use the base polymer, in this case the vinyldiorganosiloxy endblocked polydimethylsiloxane, and the other ingredients are added to it such as filler, if used, the platinum catalyst and then when cure is desired mixture (2) is added.

The compositions of this invention are particularly useful as elastomers, potting compounds, coatings, electrical insulation and other uses where silicone elastomers find utility. The compositions of this invention have an advantage over prior art silicone elastomers in that the composition when cured in contact with a substrate the cured silicone elastomer has improved adhesion to unprimed surfaces. Composites of silicone elastomers and metal substrates can be obtained by applying the composition of this invention with a platinum catalyst and thereafter curing the elastomer by heating above 80° C. for at least Mixture (A) contained modified organosiloxane molecules having an average of one unit of

per molecule and the amount of modified organosiloxane in the mixture was 28 mol percent where the unreacted copolymer defined in (A) made up the remainder. Mixture (B) contained modified organosiloxane molecules having an average of one unit of

per molecule and the amount of modified organosiloxane in the mixture was 56 mol percent where the unreacted copolymer defined in (A) made up the remainder. Mixture (C) contained modified organosiloxane having an average of one unit of $(CH_3CH_2O)_3SiCH_2CH_2(CH_3)SiO$ per molecule and the amount of modified organosiloxane in the mixture was 48 mol percent where the unreacted copolymer defined in (A) made up the remainder.

The silicone elastomer composition was prepared by mixing in a commercial mixer 100 parts by weight of a methylphenylvinylsiloxy endblocked polydimethylsiloxane having a viscosity of 15,000 cs. at 25° C., 30 parts by weight of a fume silica filler hydrophobed by trimethylsiloxy groups, 2.5 parts by weight of mixture (A), (B) or (C) as defined above, and 20 drops of a chloroplatinic acid catalyst. The silicone elastomer composition was cured in test bars for physical property measurements and was also cured on aluminum and steel panels for adhesion measurements in accordance with ASTM-D-903 procedure, 180° peel strength. The compositions were cured for

TABLE I

| Composition with mixture | Cure conditions, °C. | Durometer, Shore A | Tensile strength at break, p.s.i. | Elongation at break, percent | Tear strength Die B, p.p.i. | Adhesion | | | |
|---|---|---|---|---|---|---|---|---|---|
| | | | | | | Aluminum | | Steel | |
| | | | | | | Peel strength, p.l.i. | Percent cohesive failure | Peel strength, p.l.i. | Percent cohesive failure |
| Control [1] | [2] R.T. | 28 | 1,110 | 887 | 72 | 8 | 0 | 12.2 | 0 |
| Do [1] | 150 | 30 | 1,080 | 827 | 48 | 25 | 0 | 90 | 45 |
| (A) | R.T. | 32 | 880 | 807 | 84 | 45 | 0 | 30 | 0 |
| (A) | 150 | 31 | 1,180 | 900 | 74 | 122 | 100 | 122 | 100 |
| (B) | R.T. | 28 | 1,190 | 920 | 64 | 24 | 0 | 20 | 0 |
| (B) | 150 | 30 | 1,280 | 893 | 53 | 120 | 100 | 120 | 100 |
| (C) | R.T. | 27 | 1,240 | 913 | 65 | 24 | 0 | 16 | 0 |
| (C) | 150 | 27 | 1,200 | 890 | 51 | 105 | 60 | 120 | 100 |

[1] Control was 2.5 parts by weight of the copolymer as defined in (A) above.
[2] Room Temperature.

5 minutes. Although the silicone elastomer cures at room temperature, heating the composite enhances the adhesion to the metal substrate. The improved adhesion is particularly enhanced where the substrate is a metal such as aluminum or steel.

The following examples are illustrative only and should not be construed as limiting this invention which is properly delineated in the claims.

EXAMPLE 1

The following mixtures were prepared by reacting the ingredients defined below by heating 1.5 hours at 150° C.

(A)

30 parts by weight of a copolymer containing an average of two trimethylsiloxane units, three dimethylsiloxane units and five methylhydrogensiloxane units and
2.9 parts by weight vinyltriacetoxysilane (B)

30 parts by weight of the copolymer defined in (A) above and
4.0 parts by weight allyltrimethoxysilane (C)

30 parts by weight of the copolymer defined in (A) above and
4.0 parts by weight of vinyltriethoxysilane.

15 minutes at 150° C. and also for one week at room temperature. The results were as shown in Table I.

On samples of the room temperature cured silicone elastomer compositions the adhesion was determined after one year. The control on steel had a peel strength of 24 p.l.i. with no cohesive failure and on aluminum had a peel strength of 5 p.l.i. with no cohesive failure. The silicone elastomer with mixture (A) on steel had a peel strength of 66 p.l.i. with 10 percent cohesive failure and on aluminum had a peel strength of 90 p.l.i. with 100 percent cohesive failure. The silicone elastomer with mixture (C) on steel had a peel strength of 30 p.l.i. with no cohesive failure and on aluminum had a peel strength of 90 p.l.i. with 100 percent cohesive failure.

EXAMPLE 2

The following mixtures were prepared by reacting 30 parts by weight of the copolymer defined in Example 1, (A) with an amount of silane as shown in Table II by heating for 1.5 hours at 150° C. The mol percentage of modified organosiloxane and the adduct unit present in an average of one unit per molecule of modified organosiloxane was as shown in Table II. In each case the remaining mol percentage was unreacted copolymer as defined in Example 1, (A).

TABLE II

| Mixture | Silane | Amount of silane, parts by weight | Adduct unit | Mol percent of modified organosiloxane |
|---|---|---|---|---|
| (A) | Allyltrimethoxysilane | 2.9 | $(CH_3O)_3SiCH_2CH_2CH_2(CH_3)SiO$ | 41 |
| (B) | Vinyltriethoxysilane | 2.9 | $(CH_3CH_2O)_3SiCH_2CH_2(CH_3)SiO$ | 35 |
| (C) | Vinyltriacetoxysilane | 2.0 | $(CH_3COO)_3SiCH_2CH_2(CH_3)SiO$ | 19 |
| (D) | Allyltrimethoxysilane | 2.0 | $(CH_3O)_3SiCH_2CH_2CH_2(CH_3)SiO$ | 28 |
| (E) | Vinyltriethoxysilane | 2.0 | $(CH_3CH_2O)_3SiCH_2CH_2(CH_3)SiO$ | 24 |
| (F) | Vinyltriacetoxysilane | 4.0 | $(CH_3COO)_3SiCH_2CH_2(CH_3)SiO$ | 39 |
| (G) | do | 5.0 | $(CH_3COO)_3SiCH_2CH_2(CH_3)SiO$ | 49 |
| (H) | Allyltrimethoxysilane | 5.0 | $(CH_3O)_3SiCH_2CH_2CH_2(CH_3)SiO$ | 70 |
| (I) | Vinyltriethoxysilane | 5.0 | $(CH_3CH_2O)_3SiCH_2CH_2(CH_3)SiO$ | 60 |

The silicone elastomer compositions as described in Example 1 were prepared with the above mixtures (A) through (I) and the physical properties and adhesion properties were determined as described in Example 1. The silicone elastomers in this example were all cured for 15 minutes at 150° C. The results were as shown in Table III.

The silicone elastomer compositions were prepared by mixing on a commercial mixer 100 parts by weight of a methylphenylvinylsiloxy endblocked polydimethylsiloxane having a viscosity of 58,000 cs. at 25° C., 20 parts by weight of a fume silica as defined in Example 1, 1.5 parts by weight of a mixture of (A) through (E) as de-

TABLE III

| Composition with mixture | Durometer, Shore A | Tensile strength at break, p.s.i. | Elongation at break, percent | Tear strength Die B, p.p.i. | Adhesion Aluminum Peel strength, p.l.i. | Aluminum Percent cohesive failure | Steel Peel strength, p.l.i. | Steel Percent cohesive failure |
|---|---|---|---|---|---|---|---|---|
| Control¹ | 30 | 1,080 | 827 | 48 | 25 | 0 | 90 | 45 |
| (A) | 27 | 1,316 | 960 | 50 | 90 | 50 | 90 | 50 |
| (B) | 29 | 1,086 | 920 | 49 | 85 | 50 | 85 | 50 |
| (C) | 33 | 1,153 | 793 | 57 | 140 | 100 | 210 | 100 |
| (D) | 33 | 1,340 | 860 | 53 | 65 | 0 | | |
| (E) | 30 | 1,280 | 873 | 49 | 55 | 0 | 130 | 100 |
| (F) | 28 | 1,255 | 915 | 183 | 155 | 100 | 155 | 60 |
| (G) | 22 | 930 | 980 | 105 | 110 | 65 | 130 | 100 |
| (H) | 28 | 1,205 | 930 | 63 | 95 | 50 | 100 | 55 |
| (I) | 27 | 1,335 | 935 | 67 | 60 | 0 | 105 | 100 |

¹ Control was 2.5 parts by weight of the copolymer as defined in (A) above.

EXAMPLE 3

The following mixtures were prepared by reacting 30 parts by weight of the copolymer as defined in Example 1, (A), 2.9 parts by weight of the silanes shown in Table IV and a catalytic amount of a chloroplatinic acid catalyst by heating for one hour at 100° C. The mol percentage of modified organosiloxane present in the reacted mixture was as shown in Table IV with the remaining mol percentage being the unreacted copolymer as defined in Example 1. The modified organosiloxane contained an average of one adduct unit per molecule, the adduct unit corresponding to the silane and present in ratio as the silane was added. The adduct units were as shown in Table IV.

fined above and 20 drops of a chloroplatinic acid catalyst. The silicone elastomer was cured for testing both for physical properties and adhesion tested by heating 15 minutes at 150° C. The adhesion tests were carried out the same as in Example 1. The results were as shown in Table V.

TABLE V

| Composition with mixture | Durometer, Shore A | Tensile strength at break, p.s.i. | Elongation at break, percent | Tear strength Die B, p.p.i. | Adhesion Aluminum Peel strength, p.l.i. | Aluminum Percent cohesive failure | Steel Peel strength, p.l.i. | Steel Percent cohesive failure |
|---|---|---|---|---|---|---|---|---|
| (A) | 22 | 865 | 1,030 | 42 | 90 | 100 | 90 | 100 |
| (B) | 22 | 895 | 1,100 | 38 | 110 | 100 | 110 | 100 |
| (C) | 22 | 880 | 1,020 | 35 | 100 | 100 | 100 | 100 |
| (D) | 24 | 800 | 960 | 58 | 100 | 100 | 100 | 100 |
| (E) | 24 | 810 | 940 | 31 | 97 | 100 | 97 | 100 |

That which is claimed is:

1. A curable composition consisting essentially of (1) a vinyldiorganosiloxy endblocked polydimethylsiloxane having a viscosity of from 1000 to 100,000 cs. at 25° C. wherein the organic groups of the vinyldiorganosiloxy units are selected from the group consisting of methyl and phenyl, (2) a mixture consisting essentially of (a) an organosiloxane having an average of from 5 to 20 inclu-

TABLE IV

| Mixture | Silane | Amount of silane, parts by weight | Adduct unit | Mol percent of modified organosiloxane |
|---|---|---|---|---|
| (A) | Vinyltriacetoxysilane | 2.9 | $(CH_3COO)_3SiCH_2CH_2(CH_3)SiO$ | 28 |
| (B) | Vinyltriacetoxysilane and Allyltriacetoxysilane | 2.0 / 0.9 | $(CH_3COO)_3SiCH_2CH_2(CH_3)SiO$ / $(CH_3O)_3SiCH_2CH_2CH_2(CH_3)SiO$ | 32 |
| (C) | Vinyltriacetoxysilane and Allyltriacetoxysilane | 1.45 / 1.45 | $(CH_3COO)_3SiCH_2CH_2(CH_3)SiO$ / $(CH_3O)_3SiCH_2CH_2CH_2(CH_3)SiO$ | 35 |
| (D) | Vinyltriacetoxysilane and Allyltrimethoxysilane | 0.9 / 2.0 | $(CH_3COO)_3SiCH_2CH_2(CH_3)SiO$ / $(CH_3O)_3SiCH_2CH_2CH_2(CH_3)SiO$ | 37 |
| (E) | Allyltrimethoxysilane | 2.9 | $(CH_3O)_3SiCH_2CH_2CH_2(CH_3)SiO$ | 41 | sive silicon atoms per molecule, organosiloxane units bonded together through silicon-oxygen-silicon bonds and selected from the group consisting of dimethylsiloxane units and methylhydrogensiloxane units and endblocked with organosiloxane units selected from the group consisting of trimethylsiloxane units and dimethylhydrogensiloxane units, there being present an average of at least three silicon-bonded hydrogen atoms per molecule and (b) a modified organosiloxane having an average of from 6 to 21 silicon atoms per molecule, organosiloxane units bonded together through silicon-oxygen-silicon bonds selected from the group consisting of dimethylsiloxane units, methylhydrogensiloxane units and $$(RO)_3Si(CH_2)_x(CH_3)SiO$$

units wherein R is a monovalent radical selected from the group consisting of methyl, ethyl and

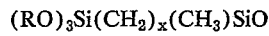

and $x$ is an integer of from 2 to 3 inclusive, and endblocked with organosiloxane units selected from the group consisting of trimethylsiloxane units, dimethylhydrogensiloxane units and $(RO)_3Si(CH_2)_x(CH_3)_2SiO_{0.5}$ units, there being present an average of at least two silicon-bonded hydrogen atoms per molecule and an average of one siloxane unit selected from the group consisting of $(RO)_3Si(CH_2)_x(CH_3)SiO$ units and $$(RO)_3Si(CH_2)_x(CH_3)_2SiO_{0.5}$$

units, said mixture (2) being present in an amount sufficient to provide at least one silicon-bonded hydrogen atom per vinyl radical in (1) and not more than 10 silicon-bonded hydrogen atoms per vinyl radical in (1), said mixture having present from 15 to 75 mol percent modified organosiloxane (b) where (a) and (b) are 100 mol percent.

2. The composition in accordance with claim 1 in which the endblocking unit of (1) is methylphenylvinylsiloxy, the viscosity of (1) is from 2000 to 60,000 cs. at 25° C., R is

and $x$ is 2.

3. The composition in accordance with claim 1 in which the endblocking unit of (1) is methylphenylvinylsiloxy, the viscosity of (1) is from 2000 to 60,000 cs. at 25° C., R is methyl and $x$ is 3.

4. The composition in accordance with claim 1 in which the endblocking unit of (1) is methylphenylvinylsiloxy, the viscosity of (1) is from 2000 to 60,000 cs. at 25° C., R is ethyl and $x$ is 2.

5. The composition in accordance with claim 1 in which the endblocking unit of (1) is methylphenylvinylsiloxy, the viscosity of (1) is from 2000 ot 60,000 cs. at 25° C., some R groups are

and the remainder of the R groups are methyl and where R is

$x$ is 2 and where R is methyl, $x$ is 3.

6. The composition in accordance with claim 1 in which a filler is present.

7. The composition in accordance with claim 6 in which the filler is a reinforcing silica filler.

8. The composition in accordance with claim 2 in which a filler is present.

9. The composition in accordance with claim 3 in which a filler is present.

10. The composition in accordance with claim 4 in which a filler is present.

11. The composition in accordance with claim 5 in which a filler is present.

References Cited
UNITED STATES PATENTS

| | | | |
|---|---|---|---|
| 3,527,655 | 9/1970 | Ballard | 260—46.5 UA |
| 3,647,917 | 3/1972 | Schulz et al. | 260—46.5 G X |

LEWIS T. JACOBS, Primary Examiner

U.S. Cl. X.R.

260—46.5 G, 46.5 UA